Patented Mar. 21, 1933

1,902,735

UNITED STATES PATENT OFFICE

SETSURO TAMARU, OF KAMAKURA GUN, KANAGAWA KEN, AND YUKO KOIZUMI, OF EBARA GUN, TOKYO FU, JAPAN, ASSIGNORS TO MITSUBISHI KOGYO KABUSHIKI KAISHA, OF TOKYO, JAPAN, A CORPORATION OF JAPAN

PROCESS FOR TREATING MATERIAL CONTAINING TIN

No Drawing. Application filed September 11, 1928, Serial No. 305,313, and in Japan February 7, 1928.

This invention relates to a process for treating material containing tin, such as raw cassiterite, tin-holding tungsten ore, etc. with oxide or carbonate of alkaline earth metal in the presence of a small quantity of reducing agent acting as an activator, for the purpose of converting tin into the form easily soluble in an acidic or alkaline solution. The object thereof is to separate tin from admixtures such as silica, silicates, iron oxides and the like in an easy and economical way.

It is well known that tin has an amphoteric property of easily combining with acidic as well as basic compounds, thus forming on one hand various kinds of stannous and stannic compounds and on the other metastannate, stannate and the like. Many processes have hitherto been studied or tried to separate tin from its admixtures by taking advantage of the above property. However, the tin is generally admixed with both acidic and basic substances, for instance such as silica on the one hand and iron oxide on the other. If such mixture is treated with an acid or an acidic substance, not only tin, but basic substances like iron are also converted into soluble form, thus consuming an excess of the acidic reagent and necessitating further treatment for separating tin from the solution. Moreover, it is impracticable as long as tin is present in the form of cassiterite, which is insoluble in acid. If the raw material is treated with alkaline substance in order to convert tin into stannate, the admixture such as silica is also converted at the same time into soluble form, thus making the separation of the tin from its admixture difficult and expensive, if not impossible. The process of first reducing the raw material and then dissolving the metallic tin in acidic or alkaline solution is similarly impractical for separating the tin, because the dissolution of tin usually takes place slowly and the admixed impurities are also acted upon at the same time. It will be seen that it is no easy matter to separate tin from its admixture in an economical and technically practicable way. The difficulty increases as the tin contents of the raw material diminishes.

For instance, it has hitherto been impossible to work economically the tailings of tin ore dressing containing only about one and a half percent of tin into metallic tin or any pure tin compound. Even poor tin ores had to be first converted into concentrates by means of ore-dressing before it could be worked into metallic tin, because the processes for working such poor ores directly failed to compete with ordinary metallurgical processes dealing with tin-concentrates. To such category of processes belongs the proposal or chloridizing roasting, for this failed to be of any practical use after many elaborate studies, simply because the vapor pressure of tin chloride even at as high a temperature as 900° C. proved to be comparatively small and the complete expelling of tin as chloride vapor too expensive.

Applicants have now discovered that oxide of tin, which is insoluble in both acid and alkali, can be rendered soluble both in an acid and an alkali if heated with oxide or carbonate of alkaline earth metal such as oxide or/and carbonate of calcium, magnesium, or the like in the presence of a certain kind of activator. The activator need not be present in a stoichiometric quantity and as a rule only a small trace of it is sufficient to induce the complete chemical change. Thus, a small trace of metallic tin, zinc, carbon, or gaseous substance such as carbonic oxide, or hydrogen induces the reaction in a surprising manner. The following example shows this fact clearly.

Example:—Take 100 lbs. of tailings of tin ore dressing containing 2.8% $SnO_2$, 64% $SiO_2$, 20% $Fe_2O_3$, 12% $Al_2O_3$, 1.2% CaO, 1.5% CuS, 0.9% MgO. The sample is in the finest state of subdivision and cannot be further ore-dressed technically in order to make cassiterite concentrate out of it. Add 0.5% charcoal and 5.7 lbs. of lime thereto and ignite the same at 850° C. for half an hour. If the ignition product is treated with dilute sulphuric acid, almost all tin is dissolved out together with a small quantity of iron, but none of the other detrimental components will be found in an appreciable quantity in the filtrate. If the ignition product is treated with dilute caustic soda instead of an acid, tin is also extracted with good yield, but no appreciable quantity of iron and silica is found in the solution.

In the above example some other activator may be employed or several activators may be used together, the quantity to be used varying according to the condition of that time. If carbon is used as the activator and the mixture roasted in an oxidizing atmosphere, the activator (here carbon) is to a great extent destroyed or consumed before it acts, and therefore it is necessary that it should be present in a sufficient quantity, say 0.5%. If the roasting takes place in an inert atmosphere, 0.05% carbon or even less is sufficient to convert the whole tin into soluble form. The same is true of other activators. It is remarkable that the cassiterite need not be present in a powdered form, but may be present in a coarse state. In such a case the solid cassiterite is found to diffuse freely into the basic substance.

Applicants have also found that the percentage of yield of tin in the extraction by alkali from the ignition product can be enhanced if certain salts or metallic compounds, for instance such as sodium chloride are added to the roasting charge or preferably to the extracting alkali solution.

In carrying out this invention, many kinds of basic materials may be employed separately or together, but oxide or/and carbonate of lime is most economical and efficient, whereas the activator may be coal, charcoal, oil or metals, for instance zinc in the proportion of one thousandth by weight of the cassiterite present. Sometimes the activator is present in the charge and need not be purposely added, for the presence of a small trace of some organic matter in the charge sometimes suffices to induce the reaction. This is of course the case only when the charge is ignited in an atmosphere having no oxidizing or consuming action on the activating organic substance, and if the atmosphere is slightly reducing, no activator has to be added, because the reducing gas itself serves as an activator.

The main feature of this invention consists in converting tin alone into a soluble form, while silica, iron oxide and the others remain untouched and unchanged, that is just as insoluble in acid and alkali after the treatment as before.

We claim:

1. A process for treating ores containing tin with oxygen containing alkaline earth metal compounds, which consists in igniting the mixture in the presence of a trace of reducing agent, and converting tin into the form easily soluble in acid and alkali, thereby to render possible its technical separation from its admixture.

2. A process for treating ores containing tin with oxide of alkaline earth metal, which consists in igniting the mixture in the presence of a trace of reducing agent, and a converting tin into the form easily soluble in acid and alkali, thereby to render possible its technical separation from its admixture.

3. A process for treating ores containing tin with oxygen containing alkaline earth metal compounds, which consists in igniting the mixture in the presence of a trace of reducing agent and a compound of alkali metal salt, and converting tin into the form easily soluble in acid and alkali, thereby to render possible its technical separation from its admixture.

4. A process for treating ores containing tin with oxide of alkaline earth metal, which consists in igniting the mixture in the presence of a trace of reducing agent and a compound of alkali metal salt, and converting tin into the form easily soluble in acid and alkali, thereby rendering possible its technical separation from its admixture.

5. A process for treating ores containing tin with oxide of alkaline earth metal, which consists in igniting the mixture in the presence of a trace of reducing agent and extracting tin therefrom by a solution containing alkali and a salt of alkali metal.

6. A process for treating ores containing tin with oxygen containing alkaline earth metal compounds, which consists in igniting the mixture in the presence of a trace of reducing agent and extracting tin therefrom by a solution containing alkali and a salt of alkali metal.

SETSURO TAMARU.
YUKO KOIZUMI.